United States Patent [19]

Mardon et al.

[11] Patent Number: 5,648,995
[45] Date of Patent: Jul. 15, 1997

[54] METHOD OF MANUFACTURING A TUBE FOR A NUCLEAR FUEL ASSEMBLY, AND TUBES OBTAINED THEREBY

[75] Inventors: Jean-Paul Mardon, Caluire; Jean Sevenat, Saint-Brevin-les-Pins; Daniel Charquet, Ugine Cedex, all of France

[73] Assignee: Framatome, Courbevoie, France

[21] Appl. No.: 579,372

[22] Filed: Dec. 27, 1995

[30]   Foreign Application Priority Data

Dec. 29, 1994 [FR] France .................. 94 15874

[51] Int. Cl.$^6$ ........................... G21C 3/07
[52] U.S. Cl. .................. 376/261; 376/457; 420/422; 148/672
[58] Field of Search ............... 376/260, 261, 376/457; 976/DIG. 44; 420/422, 423; 148/421, 672

[56]   References Cited

U.S. PATENT DOCUMENTS

| | | | |
|---|---|---|---|
| 4,201,574 | 5/1980 | Kowaka et al. | 148/442 |
| 4,614,550 | 9/1986 | Leonard et al. | 148/672 |
| 4,717,534 | 1/1988 | Morita | 376/419 |
| 4,775,428 | 10/1988 | Bunel et al. | 420/422 |
| 4,881,992 | 11/1989 | Bunel et al. | 420/422 |
| 4,981,527 | 1/1991 | Charquet | 148/672 |
| 4,992,240 | 2/1991 | Komatsu et al. | 420/422 |
| 5,366,690 | 11/1994 | Garde | 420/461 |
| 5,560,790 | 10/1996 | Nikulina et al. | 148/672 |

FOREIGN PATENT DOCUMENTS

| | | |
|---|---|---|
| 0192405 | 8/1986 | European Pat. Off. . |
| 2575764 | 7/1986 | France . |

*Primary Examiner*—Daniel D. Wasil
*Attorney, Agent, or Firm*—Pollock, Vande Sande & Priddy

[57]   ABSTRACT

The method serves to manufacture tubes for constituting sheaths for nuclear fuel rods. A bar is made out of a zirconium-based alloy containing 50 ppm to 250 ppm iron, 0.8% to 1.3% by weight niobium, less than 1600 ppm oxygen, less than 200 ppm carbon, and less than 120 ppm silicon. The bar is heated to a temperature in the range 1000° C. to 1200° C. and is quenched in water. A blank is extruded after heating to a temperature in the range 600° C. to 800° C. and cold-rolled in at least four passes in order to obtain a tube, with intermediate heat treatment being performed between passes at temperatures in the range 560° C. to 620° C. A final heat treatment is performed at a temperature in the range 560° C. to 620° C., all of the heat treatments being performed under an inert atmosphere or a vacuum.

9 Claims, 1 Drawing Sheet

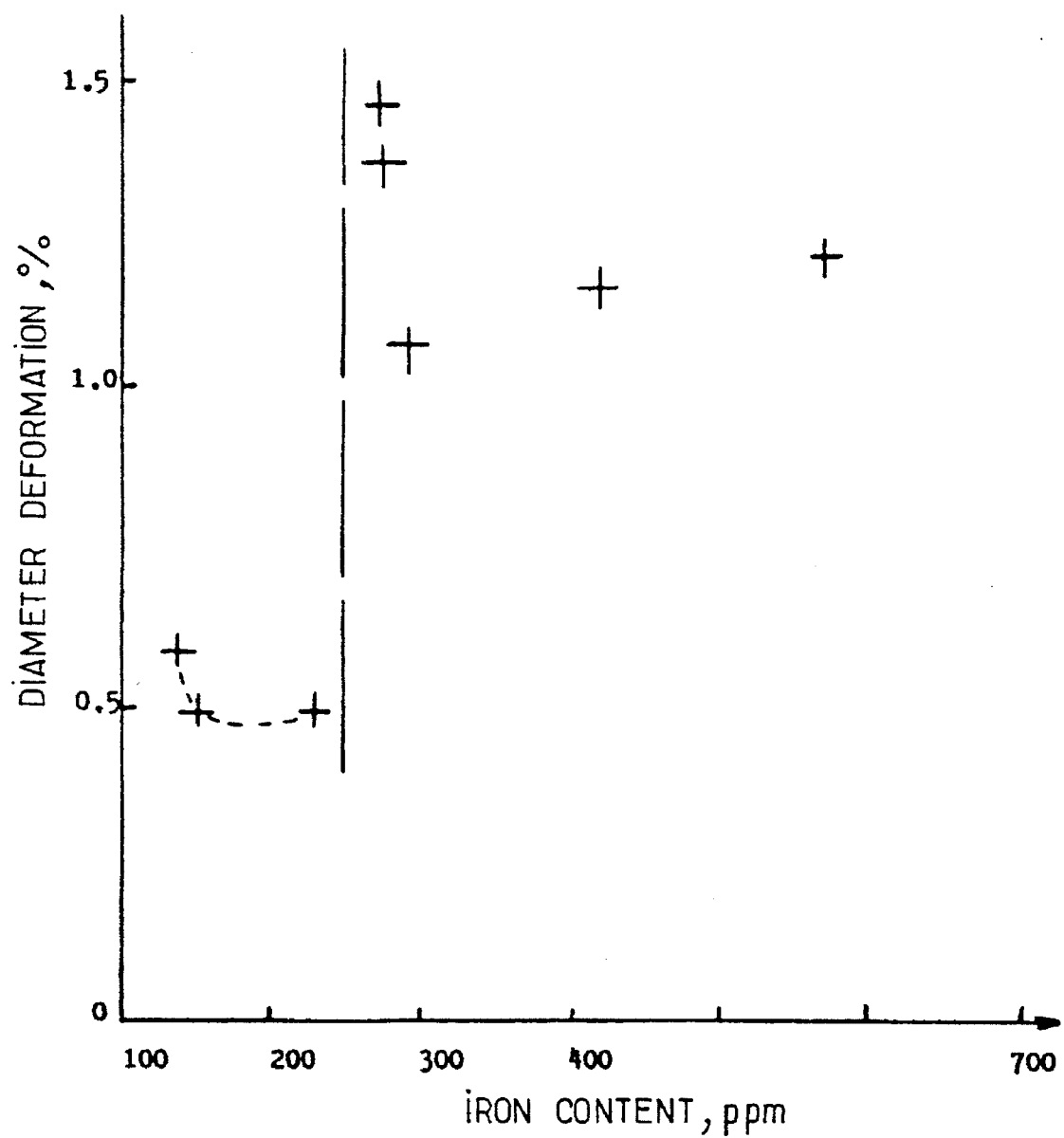

METHOD OF MANUFACTURING A TUBE FOR A NUCLEAR FUEL ASSEMBLY, AND TUBES OBTAINED THEREBY

BACKGROUND OF THE INVENTION

The present invention relates to tubes of zirconium-based alloy for constituting all or the outer portion of a sheath for a nuclear fuel rod, or a guide tube for receiving a control rod in a fuel assembly. A major, although non-exclusive, application of the invention lies in the field of manufacturing sheathing tubes for fuel rods intended for pressurized water reactors or PWRs.

Until now, use has been made in particular of sheaths made of a zirconium-based alloy known as "Zircaloy 4" and that contains, by weight:

1.20% to 1.70% tin 0.18% to 0.24% iron 0.07% to 0.13% chromium where the total iron plus chromium content lies in the range 0.28% to 0.37%. Conventionally, the ratio of iron content to chromium content lies in the range about 1.38 to 3.42.

Usually, the oxygen content of a "Zircaloy 4" does not exceed 0.16%, and in general it is much smaller.

The mechanical strength of Zircaloy 4 sheaths has been found to be satisfactory, however their corrosion by pressurized water at high temperature has limited the length of time they can be kept in a reactor.

Sheaths have already been proposed made of a Zr-Nb alloy having about 2.5% niobium (U.S. Pat. No. 4,717,534) which have been found to have good corrosion resistance in a high temperature aqueous medium. Unfortunately, that alloy has poor hot creep behavior. It has been improved by doping the alloy with an oxygen content lying in the range 0.10% to 0.16% by weight and by subjecting the sheath to final heat treatment for recrystallization. Nevertheless, the hot creep behavior of such an alloy remains less good than that of other sheathing materials.

SUMMARY OF THE INVENTION

An object of the present invention is to provide a method of manufacturing sheathing tubes making it possible to achieve a tube that has simultaneously good resistance to corrosion in a high temperature aqueous medium and satisfactory high temperature creep behavior, without that giving rise to manufacturing difficulties leading to a high reject rate.

To this end, the invention provides in particular a method of manufacturing zirconium-based alloy tubes also containing 50 ppm to 250 ppm iron, 0.8% to 1.3% by weight niobium, less than 1600 ppm oxygen, less than 200 ppm carbon, and less than 120 ppm silicon, said method comprising:

transforming the hot ingot (e.g. by forging or by rolling) to obtain a bar;

quenching the bar in water after heating it in an electric furnace or an induction furnace to between 1000° C. and 1200° C.;

extruding a hollow billet blank after heating to a temperature lying in the range 600° C. to 800° C.;

optionally applying heat treatment to the blank, in the range 560° C. to 620° C.; and cold rolling at least four times in the form of tubes of decreasing thickness with intermediate heat treatments and with final heat treatment at a temperature lying in the range 560° C. to 620° C., all heat treatments being performed under an inert atmosphere or under a vacuum.

The tube made in this way is not subjected to further heat treatment that might change its metallurgical structure until the moment it is used as a sheathing tube or as a guide tube. Nevertheless, it may receive further surface treatment and be subjected to inspection. The surface treatment may comprise, in particular, sanding and chemical pickling followed by washing. The surface treatment may be finished off by polishing using a circulating band or a wheel. Inspection is performed in conventional manner.

It is important to not exceed a iron content of 250 ppm. It has been observed, unexpectedly, that the high temperature creep performance drops off sharply when the iron content exceeds 250 ppm. In practice, an iron content lying in the range 100 ppm to 200 ppm gives good results.

It is also essential to avoid subjecting the alloy to any heat treatment at a temperature greater than 620° after extrusion. Heat treatment exceeding this temperature greatly reduces hot corrosion resistance, as shown by the following results obtained by corrosion tests in an autoclave in steam at 500° C. constituting a uniform corrosion test for zirconium alloys containing 1% niobium.

BRIEF DESCRIPTION OF THE DRAWINGS

The sole FIGURE shows test results showing the diametral deformation obtained at different iron contents under conditions representative of those to which a sheath is subjected, for an alloy containing 1% niobium.

DESCRIPTION OF PREFERRED EMBODIMENTS

EXAMPLE 1

Intermediate treatments: 2 hours at 580° C.

Final treatment: 2 hours at 580° C.

EXAMPLE 2

Intermediate treatments: 2 hours at 700° C.

Final treatment: 2 hours at 580° C.

EXAMPLE 3

Intermediate treatments: 2 hours at 700° C.

Final treatment: 2 hours at 700° C.

The mass increases during autoclave testing were as follows:

Example 1: 48 mg/dm$^2$

Example 2: 57 mg/dm$^2$

Example 3: 63 mg/dm$^2$

The samples in all three examples had an iron content of 150 ppm.

It was observed that the alloy presented a "memory" phenomenon such that the effect of a single treatment at above 620° C. applied to the alloy later than the first pass was never completely "forgotten".

In general, the intermediate heat treatments should be performed at a set temperature lying in the range 565° C. to 605° C.; a temperature greater than 580° C. for the intermediate treatments and a temperature of about 580° C. for the final treatment have been found to be particularly satisfactory for most compositions.

A tube can be manufactured from an extruded blank in particular by performing four or five passes separated by heat treatments in the range 560° C. to 620° C., and advantageously close to 620° C.

An oxygen content of about 1200 ppm has been found satisfactory to obtain a favorable effect on the resistance to creep in a recrystallized alloy.

The invention also proposes a sheathing or guidance tube for a fuel assembly for a nuclear reactor that is cooled and moderated by pressurized water, the tube being made of a zirconium-based alloy in the fully recrystallized state, having 50 ppm to 250 ppm iron, 0.8% to 1.3% by weight niobium, 1000 ppm to 1600 ppm oxygen, less than 200 ppm carbon, less than 120 ppm silicon, the balance being zirconium, excepting unavoidable impurities.

When the alloy made in this way is examined, it can be seen that there are no alignments of β Zr precipitates, which are harmful from the corrosion point of view.

Comparative tests have been performed on alloys having niobium contents lying in the range 0.86% to 1.3% and iron contents lying in the range 100 ppm to 150 ppm.

A representative manufacturing range, starting from a forged bar having a diameter of 177 mm, is as follows:

quenching in water after heating for 1 hour at 1050° C.;

machining a billet having an outside diameter of 168 mm and an inside diameter of 48 mm;

extrusion after induction heating to 650° C. to obtain an outside diameter of 80 mm and an inside diameter of 48 mm;

rolling tubes in five cycles, including intermediate heat treatments for 2 hours at 580° C.; and final heat treatments for 2 hours at 580° C.

Tests showed generalized corrosion resistance in a high temperature aqueous medium representative of conditions in a high pressure water reactor comparable to those of known Zr-Nb alloys having a high niobium content; they also showed hot creep strength much better than that of known alloys and very comparable to that of the best "Zircaloy 4" alloys: thus, after 240 hours at 400° C. under 130 MPa, the following creepage diameter deformations were measured:

Zr: 1% Nb, 150 ppm Fe, recrystallized: 0.5;

"Zircaloy 4" recrystallized from a composition that is optimal from the creep point of view: ≦1.0%.

We claim:

1. A method of manufacturing a tube for constituting at least an outer part of a sheath of a nuclear fuel rod or a guide tube of a nuclear fuel assembly, comprising the steps of:

(a) forming a bar of an alloy of zirconium containing 50 ppm to 250 ppm iron, 0.8% to 1.3% by weight niobium, less than 1600 ppm oxygen, less than 200 ppm carbon, and less than 120 ppm silicon;

(b) heating the bar to between 1000° C. and 1200° C. and quenching the bar in water;

(c) extruding a blank from said bar after heating said bar to the range 600° C. to 800° C.;

(d) cold rolling said blank in at least four passes to obtain a tube, with intermediate heat treatments in the range 560° C. to 620° C.; and (e) performing a final heat treatment in the range 560° C. to 620° C., all of the heat treatments being performed under an inert atmosphere or under a vacuum.

2. A method according to claim 1, wherein step (d) includes four or five cold rolling passes starting from the extruded blank.

3. A method according to claim 1, further comprising a step of carrying out a heat treatment at a temperature in the range 560° C. to 620° C. after step (c).

4. A method according to claim 1, wherein said intermediate heat treatments are performed for a period of two hours to four hours, at a set temperature in the range 565° C. to 605° C.

5. A method according to claim 1, wherein the final heat treatment is performed for a period of two to four hours at a temperature lying in the range 565° C. to 605° C.

6. A method according to claim 5, wherein the final heat treatment is a temperature of about 580° C.

7. A method according to claim 1, wherein the iron content is about 150 ppm.

8. A method according to claim 1, wherein the oxygen content lies in the range 1000 ppm to 1600 ppm.

9. A sheathing tube for a fuel assembly of a PWR made of a zirconium-based alloy in fully recrystallized condition, having 50 ppm to 250 ppm iron, 0.8% to 1.3% by weight niobium, 1000 ppm to 1600 ppm oxygen, less than 200 ppm carbon, less than 120 ppm silicon, the balance being zirconium and unavoidable impurities.

* * * * *

UNITED STATES PATENT AND TRADEMARK OFFICE
CERTIFICATE OF CORRECTION

PATENT NO. : 5,648,995
DATED : July 15, 1997
INVENTOR(S) : Mardon et al.

It is certified that error appears in the above-indentified patent and that said Letters Patent is hereby corrected as shown below:

Title page, add the following:

Item [73] Assignee: Framatome, Generale Des Matieres Nucleaires, and Zircotube

Signed and Sealed this

Sixteenth Day of June, 1998

Attest:

BRUCE LEHMAN

Attesting Officer

Commissioner of Patents and Trademarks